United States Patent [19]

Frenkel

[11] Patent Number: 5,838,268
[45] Date of Patent: Nov. 17, 1998

[54] APPARATUS AND METHODS FOR MODULATION AND DEMODULATION OF DATA

[75] Inventor: Liron Frenkel, Ramat Gan, Israel

[73] Assignee: Orckit Communications Ltd., Tel Aviv, Israel

[21] Appl. No.: 818,388

[22] Filed: Mar. 14, 1997

[51] Int. Cl.$^6$ ........................................... H03M 1/00
[52] U.S. Cl. ..................................................... 341/11
[58] Field of Search ................................. 341/111, 112, 341/114, 113, 115, 116; 332/103; 375/61, 67

[56] References Cited

U.S. PATENT DOCUMENTS

| | | | |
|---|---|---|---|
| 4,833,706 | 5/1989 | Hughes-Hartogs | 379/98 |
| 5,008,670 | 4/1991 | Zimmer | 341/113 |

OTHER PUBLICATIONS

B.R. Saltzberg, "Performance of an Efficient Parallel Data Transmission System", *IEEE Trans. on Comm. Tech.,* vol. COM–15, No. 6 (Dec. 1967) 805–811.

P. Duhamel, "Implementation of 'Split–Radix' FFT Algorithms for Complex, Real, and Real–symmetric Data", *IEEE Trans. on Acoustics, Speech and Signal Processing,* vol. ASSP–34, No. 2 (Apr. 1986) 285–295.

J.A.C. Bingham, "Multicarrier Modulation for Data Transmission: An Idea Whose Time Has Come", *IEEE Communication Magazine* (May 1990) 5–14.

B. Hirosaki, An Analysis of Automatic Equalizers for Orthogonally Multiplexed QAM Systems, *IEEE Trans. Comm.,* vol. COM–28 (Jan. 1980) 73–83.

P.P. Vaidyanathan, *Multirate Systems and Filters Banks* (Englewood Cliffs: P T R Prentice–Hall, Inc., 1993) pp. 84, 76, 86, 134, 136, 140 and 142.

A.V. Oppenheim et al., *Discrete–Time Signal Processing* (Englewood Cliffs: Prentice–Hall, Inc., 1989) pp. 514–520.

*ADSL Standard* TIE1.4/95–007R2, pp. 22–49 (no date given).

*Primary Examiner*—Brian K. Young
*Attorney, Agent, or Firm*—Darby & Darby

[57] ABSTRACT

A signal modulation method comprising receiving at least first and second synchronized incoming streams of complex symbols, thereby to define a plurality of incoming vectors each including at least first and second synchronized complex symbols, mapping each complex symbol into a signal component comprising a linear combination of an in-phase signal and a quadrature signal, the quadrature signal comprising a Hilbert transform of said in-phase signal, wherein all of the signal components are substantially mutually orthogonal and wherein the frequency spectrums of all signal components mapped from a single incoming stream are centered around a common frequency location which is unique to the single incoming stream and wherein the frequency spectrums of signal components mapped from different incoming streams having adjacent common frequency locations are partially overlapping and wherein signal components mapped from sequential incoming symbols partially overlap in time and combining all of the signal components into a representation of an output signal.

30 Claims, 15 Drawing Sheets

Define parameters $T, \Delta f, M$ and let $\alpha = 2(\Delta f \cdot T - 1)$

Main Frequency Component: Generate a raised cosine function $R(f)$:

$$R(f) = \begin{cases} T & 0 \le f \le (1-\alpha)/2T \\ \dfrac{T}{2}\left[1 - \sin\dfrac{\pi T(f - \frac{1}{2T})}{\alpha}\right] & (1-\alpha)/2T \le f \le (1+\alpha)/2T \\ 0 & |f| > (1+\alpha)/2T \end{cases}$$

Auxiliary Frequency Component: Generate $A(f)$ by finding the roots of $$A(f)\left[\sqrt{R^2\left(f + (\tfrac{1}{T} - \tfrac{\Delta f}{2})\right) - A^2(f)} + \sqrt{R^2\left(f - (\tfrac{1}{T} - \tfrac{\Delta f}{2})\right) - A^2(f)}\right]$$

$$= R\left(f + \tfrac{\Delta f}{2}\right) R\left(f - \tfrac{\Delta f}{2}\right)$$

P-OFDM signal in frequency: Compute $P(f)$ from $A(f)$ and $R(f)$ $$P(f) = \sqrt{R^2(f) - A^2\left(f - (\tfrac{1}{T} - \tfrac{\Delta f}{2})\right) - A^2\left(f + (\tfrac{1}{T} - \tfrac{\Delta f}{2})\right)}$$

$$- A\left(f - (\tfrac{1}{T} + \tfrac{\Delta f}{2})\right) - A\left(f + (\tfrac{1}{T} + \tfrac{\Delta f}{2})\right)$$

P-OFDM Coefficients:
Sample $P(f)$ in frequency in the interval $f = -M/2T$ to $+M/2T$, and use Discrete Fourier Transform (DFT) to compute the coefficients: $g = DFT(P(f))$

FIGURE 6

APPARATUS AND METHODS FOR MODULATION AND DEMODULATION OF DATA

FIELD OF THE INVENTION

The present invention relates to apparatus and methods for modulation and demodulation of data.

BACKGROUND OF THE INVENTION

Multicarrier modulation schemes and related technologies are described in the following references:

L. Doetz, T. E,. Held, and D. L. Martin, "Binary Data Transmission Techniques for linear systems", Proc IRE, Vol. 45, pp. 656–661, May 1957.

B. R. Saltzberg "Performance of an Efficient Parallel Data Transmission System", IEEE Trans. on Comm. Tech.., Vol. COM-15, no. 6, December 1967

P. Duhamel, "Implementation of Split-Radix FFT Algorithm for Complex, Real, and Real-Symmetric Data", Vol. ASSP-34, pp. 285–295, April 1986

A. C. Bingham, "Multicarrier Modulation for Data Transmission: An Idea Whose Time Has Come", IEEE Communication magazine, pp. 5–14, May 1990

B. Hirosaki, "An analysis of Automatic Equalizers for Orthogonally Multiplexed QAM systems", IEEE Trans. Commun., vol. COM-28, pp. 73–83, January 1980.

P. P. Vaidyanathan, *Multirate Systems and Filter Banks,* Prentice-Hall, Inc., 1993

A. V. Oppenheim and R. W. Schafer, *Discrete time signal processing,* Prentice-Hall, 1989.

The following description of prior multicarrier modulation schemes is summarized from the above-referenced publications by Bingham (1990):

The principle of transmitting data by dividing it into several bit streams and using these bit streams to modulate several carriers was used 40 years ago in the Collins Kineplex system [Doetz 1957]. The basic principle of Multicarrier Modulation (MCM) is grouping the input data bits into blocks of B bits and distributing these bits between the several carriers. For an input bit rate of B/T bits per second, the block (symbol) rate is 1/T. Each time interval T, the B bits are used, $B_k$ bits per carrier, to modulate $N_c$ carriers, which are spaced ▲f apart across any usable frequency band. The sum over $B_k$, k=1, 2, . . . $N_c$, is equal to B. The modulated carriers are summed for transmission, and must be separated in the receiver before demodulation.

Three main methods have been used for this separation which are termed herein the FDM (frequency division multiplexing), SQAM (staggered quadrature amplitude modulation) and DMT (discrete multi-tone) methods respectively. These prior art methods are now described:

(1) FDM—The earliest MCM modems borrowed from conventional FDM technology and used filters to completely separate the bands. The transmitted power spectra for just two sub-bands of a multicarrier system are shown in prior art FIG. 15A. Because of the difficulty of implementing very sharp filters, each of the signals must use bandwidth, $(1+\alpha)/T$ which is greater than the Nyquist minimum, 1/T. The efficiency of the band usage is $(1/T)/\blacktriangle f=1/(1+\alpha)$.

(2) SQAM—[Saltsberg 1967], [Hirosaki 1980]. Theefficiency of the band was increased to almost 100% by using Staggered Quadrature Amplitude Modulation (SQAM). The individual transmit spectra of the modulated carriers still use an excess bandwidth of $\alpha$, but they overlap at the −3 dB frequencies (as shown in prior art FIG. 15B) and the composite spectrum is flat. If $\alpha<1$, each subband overlaps only its immediate neighbors, and orthogonality of the sub-bands, with resultant separability in the receiver, is achieved by staggering the data, e.g. offsetting by half the symbol period T/2, on alternate in-phase and quadrature sub channels.

(3) DMT—As described in U.S. Pat. No. 4,833,706 and in ADSL Standard T1.413/95, the carriers are keyed by the data, using Quadrature Amplitude Shift Keying (QASK). The individual spectra are now sinc functions. As shown in prior art FIG. 15C, the individual spectra are not band limited, but, as described in the above referenced Bingham publication (1990), the signals can still be separated in the receiver. The frequency division is achieved, not by band-pass filtering, but by baseband processing. The big advantage of this approach is that both transmitter and receiver can be implemented using efficient Fast Fourier Transform (FFT) techniques.

The disclosures of all publications mentioned in the specification and of the publications cited therein are hereby incorporated by reference.

SUMMARY OF THE INVENTION

The present invention seeks to provide improved methods and apparatus for modulating and demodulating data.

One object of a preferred embodiment of the present invention is to provide a modulation/demodulation scheme with improved bandwidth efficiency, sharp ingress rejection, robustness to time and phase errors and low latency, which is therefore suitable for reliable continuous transmission of packets in multi-point systems such as HFC (hybrid fiber coax).

According to a preferred embodiment of the present invention, a modem is provided which is generally insensitive to timing and phase impairments because it employs signals which overlap in frequency and in time but maintain orthogonality. Also, unlike SQAM, each signal preferably includes an in-phase component and a quadrature component which is a Hilbert transformation of the in-phase component, rather than employing signals which include staggered in-phase and quadrature phase components as in prior art systems.

There is thus provided, in accordance with a preferred embodiment of the present invention, a signal modulation method including receiving at least first and second synchronized incoming streams of complex symbols, thereby to define a plurality of incoming vectors each including at least first and second synchronized complex symbols, mapping each complex symbol into a signal component including a linear combination of an in-phase signal and a quadrature signal, the quadrature signal including a Hilbert transform of the in-phase signal, wherein all of the signal components are substantially mutually orthogonal, and wherein the frequency spectrums of all signal components mapped from a single incoming stream are centered around a common frequency location which is unique to the single incoming stream and wherein the frequency spectrums of signal components mapped from different incoming streams having adjacent common frequency locations are partially overlapping, and wherein signal components mapped from sequential incoming symbols partially overlap in time, and combining all of the signal components into a representation of an output signal.

Further in accordance with a preferred embodiment of the present invention, each signal component is proportional to a temporal translation and/or a frequency translation of each other signal component.

Still further in accordance with a preferred embodiment of the present invention, the incoming vectors arrive at a given symbol rate and wherein each the signal component includes a main frequency component defining a central main frequency value and wherein, for each pair of signal components generated from different incoming streams, the distance between their central main frequency values exceeds the symbol rate.

Additionally in accordance with a preferred embodiment of the present invention, each signal component includes a main frequency component centered at the common frequency location and auxiliary frequency components arranged around the common frequency location.

Further in accordance with a preferred embodiment: of the present invention, the main frequency component of each signal component mapped from a particular incoming stream overlaps the main frequency component of each signal component mapped from an incoming stream having an adjacent common frequent location.

Still further in accordance with a preferred embodiment of the present invention, for each pair of signal components mapped from incoming streams having adjacent common frequency locations, the auxiliary frequency components of the pair of signal components cancel out interference resulting from the partial overlap of their main frequency components.

Additionally in accordance with a preferred embodiment of the present invention, for each pair of signal components mapped from different incoming streams whose main frequency components partially overlap, the auxiliary frequency components of the pair of signal components cancel out any interference resulting from the partial overlap of their main frequency components.

Further in accordance with a preferred embodiment of the present invention, the different incoming streams have non-adjacent common frequency locations.

Also provided, in accordance with another preferred embodiment of the present invention, is a signal demodulation method including receiving an input signal including a superposition of mutually orthogonal signal components, and generating at least first and second synchronized outgoing streams of complex symbols from the input signal, thereby to define a plurality of outgoing vectors each including at least first and second synchronized outgoing complex symbols, wherein each signal component generates a corresponding outgoing complex symbol and includes a linear combination of an in-phase signal and a quadrature signal, the quadrature signal including a Hilbert transform of the in-phase signal, and wherein the frequency spectrums of all signal components generating complex symbols in a single outgoing stream are centered around a common frequency location which is unique to the single outgoing stream and wherein the frequency spectrums of signal components generating complex symbols in different outgoing streams having adjacent common frequency locations are partially overlapping, and wherein signal components generating sequential outgoing vectors partially overlap in time.

Further in accordance with a preferred embodiment of the present invention, each signal component is mapped from a corresponding original complex symbol.

Additionally provided, in accordance with yet another preferred embodiment of the present invention, is a signal modulation system including a complex symbol filter array operative to receive at least first and second synchronized incoming streams of complex symbols, thereby to define a plurality of incoming vectors each including at least first and second synchronized complex symbols, and to filter each complex symbol into a baseband representation of a signal component including linear combination of an in-phase signal and a quadrature signal the quadrature signal including a Hilbert transform of the in-phase signal, wherein all of the signal components are substantially mutually orthogonal, and wherein the frequency spectrums of all signal components filtered from a single incoming stream are centered around a common frequency location which is unique to the single incoming stream and wherein the frequency spectrums of signal components filtered from different incoming streams having adjacent common frequency locations are partially overlapping, and wherein signal components filtered from sequential incoming symbols partially overlap in time, and a signal component combining unit operative to combine all of the baseband representations of the signal components into a representation of an output signal.

Further in accordance with a preferred embodiment of the present invention, the combining step includes superimposing all of the baseband representation of the signal components, thereby to generate the output signal.

Still further in accordance with a preferred embodiment of the present invention, the combining step includes superimposing linear transformation of each of the baseband representations of the signal components, thereby to generate the output signal.

Further in accordance with a preferred embodiment of the present invention, all signal components mapped from a single incoming vector are centered around a common temporal location which is unique to the single incoming vector.

Still further in accordance with a preferred embodiment of the present invention, all signal components generating a single outgoing vector are centered around a common temporal location which is unique to the single outgoing vector.

Additionally in accordance with a preferred embodiment of the present invention, the representation of an output signal includes the output signal itself or samples of the output signal.

Further in accordance with a preferred embodiment of the present invention, the system also includes a complex symbol generating mapper operative to receive an input bit stream and to generate therefrom at least first and second synchronized incoming streams of complex symbols.

Still further in accordance with a preferred embodiment of the present invention, the system also includes a digital baseband-to-analog RF conversion unit operative to translate the representation of an output signal into an analog RF signal.

Additionally in accordance with a preferred embodiment of the present invention, the digital baseband-to-analog RF conversion unit includes an interpolator generating an up-sampled output, a digital RF up-converter receiving the up-sampled output and generating therefrom a digital representation of an RF signal by up-converting the up-sampled output into RF, a D/A converter operative to convert the digital representation of the RF signal into an analog RF signal, and an analog front-end operative to receive the analog signal from the D/A converter and to filter and to amplify the analog signal.

Further in accordance with a preferred embodiment of the present invention, the digital baseband-to-analog RF conversion unit includes an interpolator generating an up-sampled output, a digital IF up-converter receiving the up-sampled output and generating therefrom a digital representation of an IF signal by up-converting the up-sampled output into IF, a D/A converter operative to convert the digital representation of the IF signal into an analog IF signal, and an analog front-end operative to receive the analog IF signal from the D/A converter, to filter the analog IF signal, thereby to generate a filtered signal, to up-convert the filtered signal into RF, thereby to generate a filtered RF signal, and to amplify the filtered RF signal.

Also provided, in accordance with another preferred embodiment of the present invention, is a signal demodulation system including a narrow bandpass overlapping frequency filter array operative to receive an input signal transmitted through a communication channel, the input signal including a channel-distorted superposition of mutually orthogonal signal components and to generate at least first and second synchronized outgoing streams of complex values from the input signal, thereby to define a plurality of outgoing vectors each including at least first and second synchronized outgoing complex values, wherein each signal component generates a corresponding outgoing complex value and includes a linear combination of an in-phase signal and a quadrature signal, the quadrature signal including a Hilbert transform of the in-phase signal, and wherein the frequency spectrums of all signal components generating complex values in a single outgoing stream are centered around a common frequency location which is unique to the single outgoing stream and wherein the frequency spectrums of signal components generating complex values in different outgoing streams having adjacent common frequency locations are partially overlapping, and wherein signal components generating sequential outgoing vectors partially overlap in time, and a complex symbol detector operative to receive from the filter the at least first and second synchronized outgoing streams of complex values and to generate therefrom at least first and second streams of complex symbols.

Further in accordance with a preferred embodiment of the present invention, the complex symbol detector includes an equalizer operative to receive the at least first and second synchronized outgoing streams of complex values and to multiply them by at least first and second complex coefficients respectively, thereby to generate at least first and second streams of equalized complex values respectively, timing and phase circuitry operative to receive the at least first and second equalized complex values and to back-rotate them by at least first and second estimated angles respectively which compensate for phase and timing offsets introduced by the communication channel, thereby to generate at least first and second streams of equalized back-rotated values respectively, and a slicer operative to receive the at least first and second streams of equalized back-rotated values and to map them to first and second streams of complex symbols respectively.

Further in accordance with a preferred embodiment of the present invention, the system also includes a demapper operative to receive from the complex symbol detector at least first and second streams of complex symbols, and to demap the first and second streams of complex symbols, thereby to generate an output bit stream.

Also provided, in accordance with another preferred embodiment of the present invention, is subscriber apparatus for a cable modem system, the subscriber apparatus including an upstream forward error correction (FEC) encoder receiving an upstream bit stream and generating an encoded bit stream, an upstream modulator receiving the encoded bitstream from the upstream FEC encoder and generating an RF output, a diplexer receiving the RF output and feeding the RF output onto a cable and receiving an external downstream signal from the cable, a downstream demodulator receiving the downstream external signal from the diplexer and generating a downstream bit stream, and a MAC controller operative to generate the upstream bit stream and supply the upstream bit stream to the FEC encoder and to receive the downstream bit stream, wherein the upstream modulator includes a signal modulation system such as that described above and a complex symbol generating mapper operative to receive an input bit stream and to generate therefrom at least first and second synchronized incoming streams of complex symbols.

Further in accordance with a preferred embodiment of the present invention, the system also includes an analog RF to digital baseband converter operative to receive an input analog RF signal, to convert the input analog RF signal to an up-sampled digital representation of a baseband signal corresponding to the input analog RF signal, and a decimator operative to receive and down-sample the up-sampled digital representation of the baseband signal and to supply the down-sampled digital representation of the baseband signal to the narrow bandpass overlapping frequency filter array as an input signal.

Also provided, in accordance with still another preferred embodiment of the present invention, is headend apparatus for a cable modem system, the headend apparatus including an upstream demodulator including a signal demodulation system according to claim 24 and also including an analog RF to digital baseband converter operative to receive an input analog RF signal, to convert the input analog RF signal to a digital representation of a baseband signal corresponding to the input analog RF signal and to supply the digital representation of the baseband signal to the narrow bandpass overlapping frequency filter array as an input signal, a FEC decoder receiving an output from the upstream demodulator, a MAC controller receiving an output of the FEC decoder, and a downstream modulator receiving an output from the MAC controller.

BRIEF DESCRIPTION OF THE DRAWINGS AND APPENDICES

The present invention will be understood and appreciated from the following detailed description, taken in conjunction with the drawings in which:

FIG. 6 is a simplified flowchart illustration of an analytic method for performing the coefficient generation step of FIG. 5;

Figure 15A:
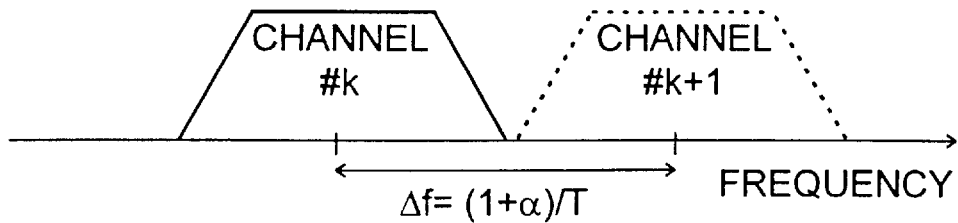
Figure 15B:
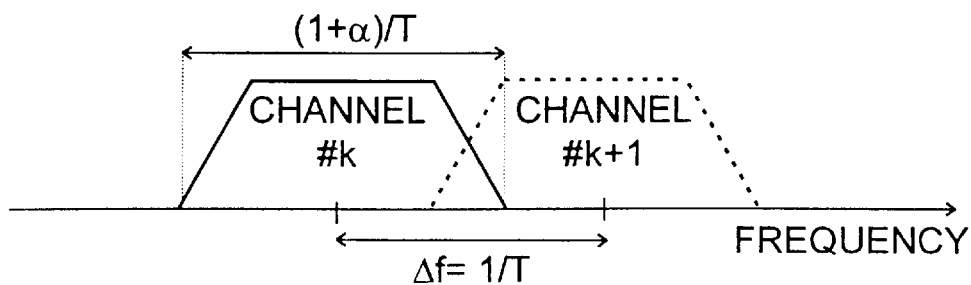
Figure 15C:
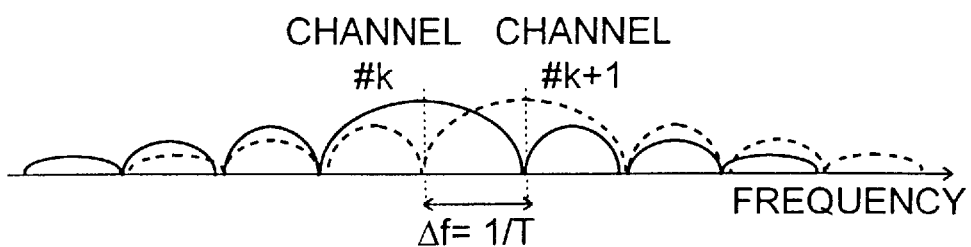
Figure 15D:
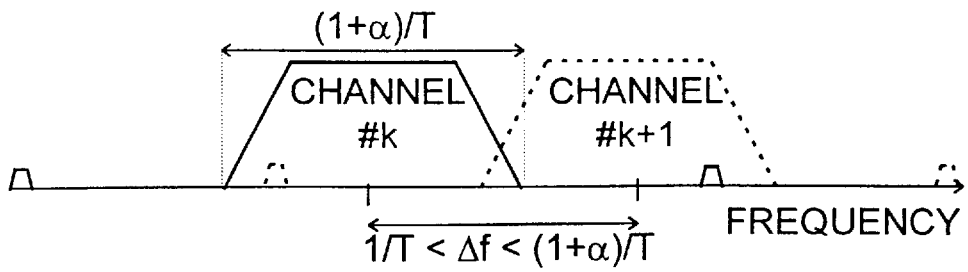

FIGS. 15A–15C are simplified graphic illustrations of the frequency spectrums of two adjacent filters from among an array of filters performing the following three prior art multicarrier modulation methods respectively: FDM (frequency division multiplexing), SQAM (staggered quadrature amplitude modulation) and DMT (discrete multitone); and FIG. 15D is a simplified graphic illustration of the frequency spectrum of two adjacent filters from among an array of filters performing a multi-carrier modulation method operative in accordance with a preferred embodiment of the present invention.

Attached herewith is the following appendix which aids in the understanding and appreciation of one preferred embodiment of the invention shown and described herein:

Appendix A is a computer listing of software procedures useful in implementing some of the methods and apparatus described herein.

DETAILED DESCRIPTION OF A PREFERRED EMBODIMENT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Figure 1:
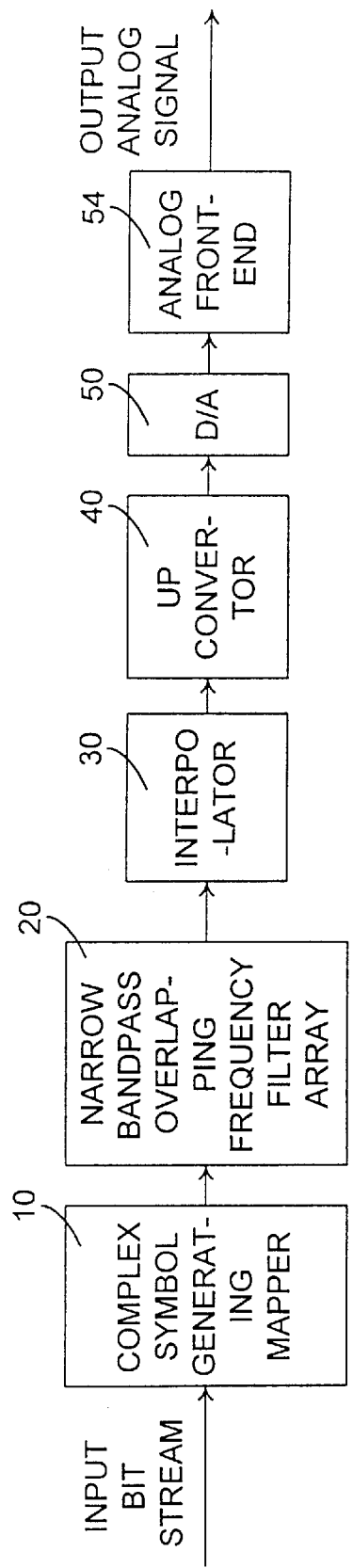
FIG. 1 is a simplified block diagram of a data modulating system constructed and operative in accordance with a preferred embodiment of the present invention.

Reference is now made to FIG. 1 which is a simplified block diagram of a data modulating system constructed and operative in accordance with a preferred embodiment of the present invention. The data modulating system of FIG. 1 includes a mapper 10 which generates a stream of complex-valued vectors from an input bit stream, as described in detail below with reference to FIG. 3. An array 20 of narrow band pass filters with overlapping frequencies receives and filters complex-valued vectors from the mapper 10, thereby to generate a single stream of complex samples. A preferred filter array is described in detail below with reference to FIG. 4.

The filter array 20 is preferably advantageous relative to existing FDM modulating filters in that a more advantageous tradeoff is provided between bandwidth efficiency and filter length. In other words, a filter array 20 having the same filter length as an existing FDM modulating filter has greater bandwidth efficiency. Conversely, a filter array 20 having the same bandwidth efficiency as an existing FDM modulating filter is shorter, providing decreased latency, implementation cost and complexity.

The filter array 20 does not demand precise phase relationships between adjacent frequency channels and between symbols which are adjacent in time. Therefore, the filter array 20 is preferably substantially less sensitive to timing and phase errors, relative to existing SQAM modulating filters, described in the above-referenced Bingham publication. As a result, the filter array 20 is particularly advantageous for transmission of short-duration packets.

The filter array 20 is preferably advantageous relative to existing DMT modulating filters in that each of the filters in the array has a frequency response which is limited in bandwidth and therefore, that filter provides better rejection of narrow band interference, relative to DMT modulating filters whose frequency response is sinc-shaped. A sinc function is the function sin x/x. Narrow band interference is also termed herein "ingress".

An interpolator 30 receives output from the filter array 20. Interpolator 30 may, for example, comprise a programmable hardware unit implementing a suitable interpolation method such as that described in Chapters 3 and 4 of the above referenced Vaidyanathan publication (1993). An up-converter 40, which may comprise either a digital up-converter, as shown, such as at least one STEL 1130 in conjunction with at least one STEL 1177, both commercially available from Stanford Telecom. Alternatively, the up-converter 40 may comprise an analog up-converter. A digital to analog converter 50 is provided after the up-converter 40, in the case that the up-converter is digital, or before the up-converter, in the case that the up-converter is analog. The D/A converter may for example comprise an AD9050 converter, commercially available from Analog Devices.

An analog front-end 54 receives analog output from the D/A unit 50 and generates the final RF output signal to be transmitted. The analog front-end 54 typically includes an analog low-pass filter and a power amplifier, such as a Lucent ATTV 4910, commercially available from Lucent Technologies, Inc.

Figure 2:
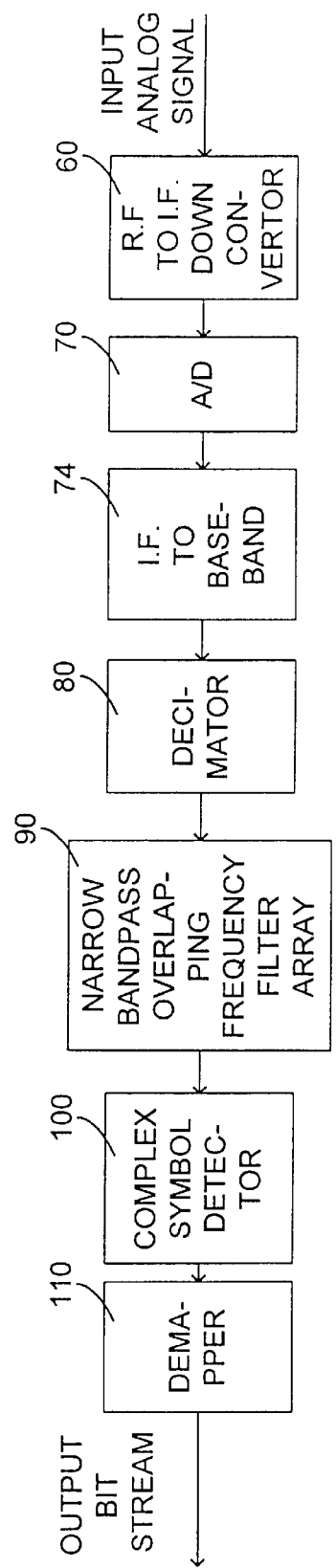
FIG. 2 is a simplified block diagram of a data demodulating system constructed and operative in accordance with a preferred embodiment of the present invention.

It is appreciated that the modulating system of FIG. 1 in conjunction with the demodulating system of FIG. 2 are particularly suitable for packetized data-over-cable applications such as coax and HFC (hybrid fiber coax) applications because an ingress problem exists in these applications and because timing robustness is important for packetized applications.

FIG. 2 is a simplified block diagram of a data demodulating system constructed and operative in accordance with a preferred embodiment of the present invention and particularly useful in demodulating data which was modulated by the data modulating system of FIG. 1 and which was then transmitted through a distorting medium such as an HFC system.

The data demodulating system of FIG. 2 preferably comprises an RF to IF down-converter 60 followed by a D/A converter 70. The down-converter 60 typically comprises a tuner operative to convert the RF modulated signal to IF. The tuner may comprise any suitable combination of conventional filters and mixers tunable within a range of approximately 5–42 MHz. The D/A converter 70 may for example comprise an AD9762 converter, commercially available from Analog Devices. The output of the D/A converter 70 is supplied to an IF to baseband converter 74 and then to decimator 80 which may be similar to up-converter 40 of FIG. 1 and which is preferably operative to carry out the inverse operation of the interpolator 30. The decimator 80 may, for example, comprise a suitable programmable hardware unit implementing a suitable decimation method such as that described in Chapters 3 and 4 of the above referenced Vaidyanathan, 1993 publication.

The output of decimator 80 is received by a narrow band pass overlapping frequency filter array 90 which typically carries out the inverse operation of the filter array 20 of FIG. 1. Filter array 90 of FIG. 2 is described below in detail with reference to FIG. 10.

The output of filter 90 is fed to a complex symbol detector 100 described in detail below with reference to FIG. 12. The detector 100 is operative to estimate the original complex symbol generated by the mapper 10 in the transmitter modulator of FIG. 1.

Figure 13:
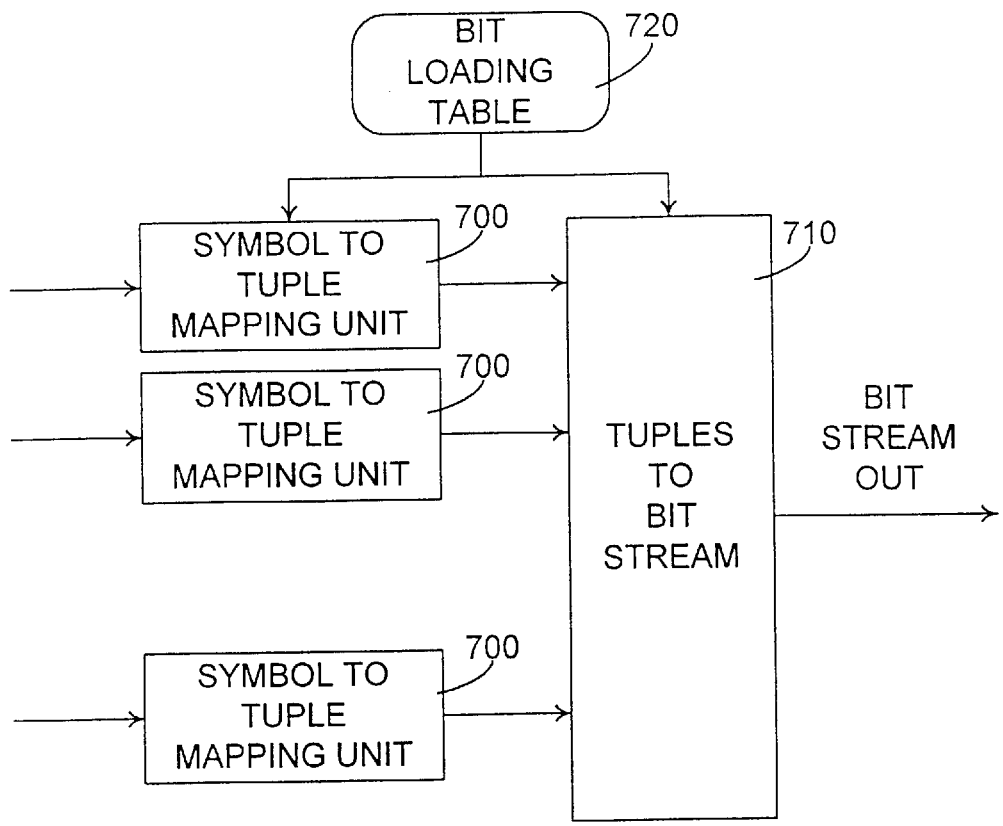
FIG. 13 is a simplified block diagram of the demapper of FIG. 2 constructed and operative in accordance with a preferred embodiment of the present invention.

A demapper 110, described in detail below with reference to FIG. 13, is operative to perform the inverse operation to the mapper 10 of FIG. 1.

Figure 3:
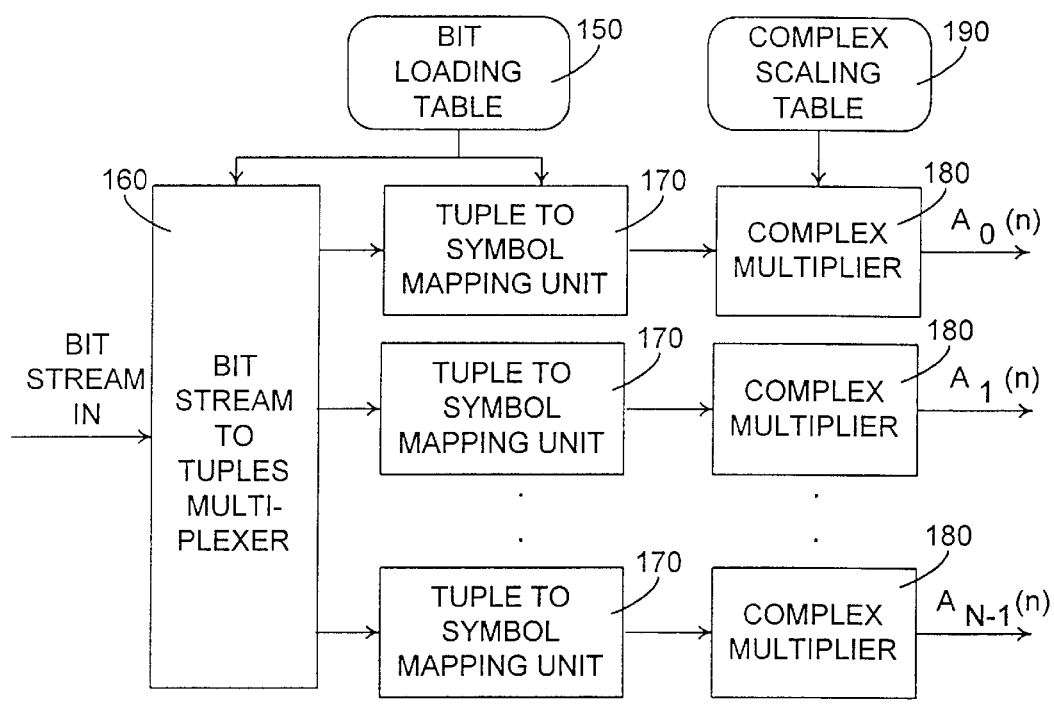
FIG. 3 is a simplified block diagram of the mapper of FIG. 1 constructed and operative in accordance with a preferred embodiment of the present invention.

FIG. 3 is a simplified block diagram of the complex symbol generating mapper 10 of FIG. 1 constructed and operative in accordance with a preferred embodiment of the present invention. As shown, the mapper includes a bit loading table 150 storing, for each of the N filters in the filter array, its bit loading or number of input bits. Typically different filters have different bit loadings ranging from 0 to 8.

A multiplexer 160 is operative to receive information from the bit loading table defining the bit loading of each of the N filters in the filter array. Based on this information, the appropriate number of bits from the input bit stream is sent to each of N mapping units 170 in turn. Each symbol period, the appropriate number of bits is supplied to all of the N mapping units 170. In other words, the various mapping units 170 receive a "tuple" of bits which may or may not include the same number of bits. Typically, at least one mapping unit 170 receives a "tuple" of zero bits at all times to facilitate operation of the interpolator 30.

Each mapping unit 170 is operative to perform a predetermined mapping or transformation process, thereby to convert the tuple it receives into a complex value or symbol. For example, the ADSL Standard T1.413/95, chapter 6.6.4 entitled "Constellation encoder", describes a suitable mapping scheme.

The output of the mapping units 170 are respectively fed to complex multipliers 180 which each multiply their input by a predetermined complex scaling factor. The complex scaling factors may be stored in a suitable table 190. Multiplication by the complex scaling factors provides a suitable scale of amplitude and, optionally, equalization, i.e. compensation for known channel phase and amplitude distortions.

Figure 4A:
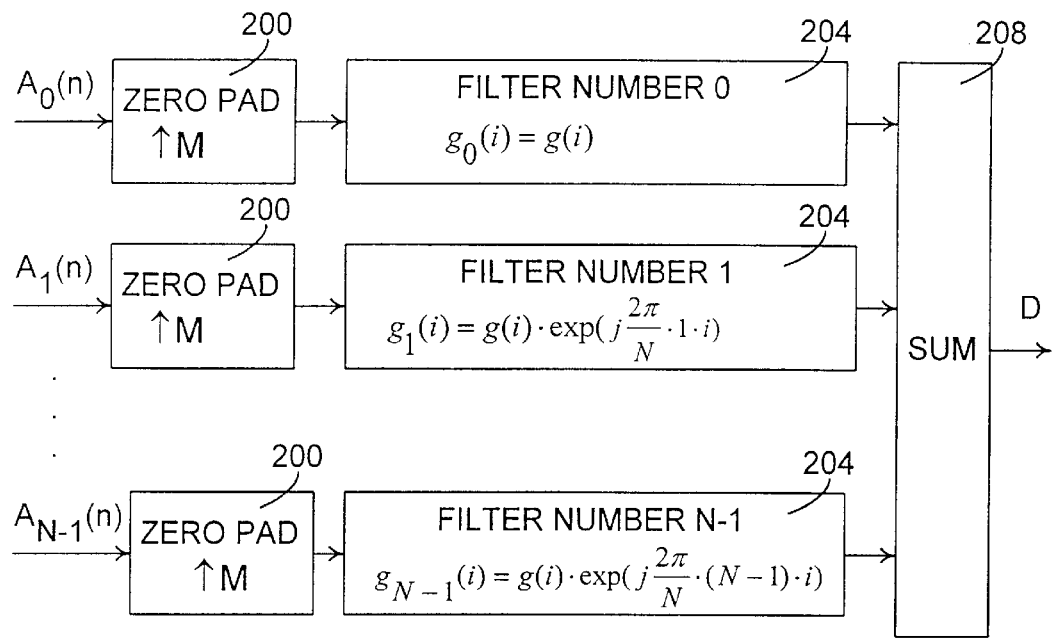
FIGS. 4a and 4b are a simplified block diagrams of the filter of FIG. 1 constructed and operative in accordance with a preferred embodiment of the present invention.

FIG. 4A is a simplified block diagram of the narrow bandpass overlapping frequency filter array of FIG. 1 constructed and operative in accordance with one embodiment of the present invention. The implementation of FIG. 4A includes N filters 204 as shown respectively associated with N zero pads 200 which concatenate M−1 zeros (M>N) after each input element $A_k(n)$ is received. The outputs of the filters 204 are summed by a summer 208.

Typically, only $N_c$ of the N filters shown in FIG. 4A are used because some of the filters receive zero inputs and these filters need not be used.

The following description uses the following notation:

TABLE 1

| | | | |
|---|---|---|---|
| T | symbol period | 31.25 | microsec |
| 1/T | symbol rate | 32 | KHz |
| ▲f | frequency spacing | 35 | KHz |
| $T_s$ | duration of symbol | 312.5 | microsec |
| L | $T_{s/T}$ | 10 | |
| N | FFT or IFFT length | 64 | |
| M | samples per symbol interval | 70 | |

▲$\Delta f$ is computed by M / (N × T).

The last column in the above table specifies examples of values for each of the parameters in the table.

Figure 4B:
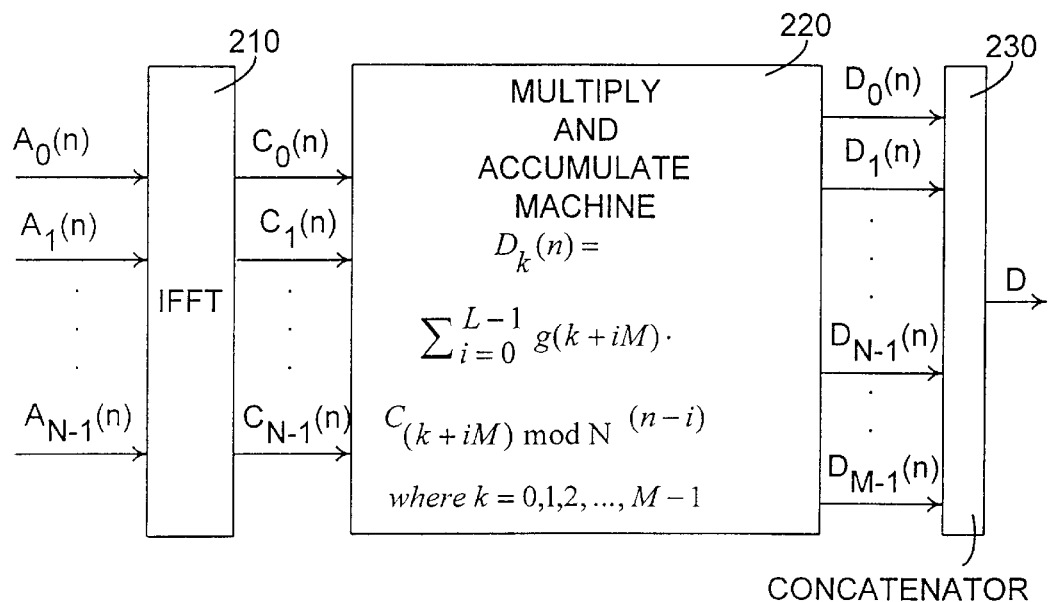

FIG. 4B is a simplified block diagram of the narrow bandpass overlapping frequency filter array of FIG. 1 constructed and operative in accordance with a preferred embodiment of the present invention.

The filter array shown in FIG. 4B includes an IFFT 210 of the Nth order which receives a vector $\{A_k(n)\}$ (k=0,1, . . . , N−1) of the output vector of the mapper of FIG. 3 where n=1, 2, 3, . . . . . The IFFT unit 210 generates therefrom a corresponding vector $(C_0(n), C_1(n), \ldots, C_{N-1}(n))$. The C vector is fed to a multiplying and accumulating machine 220. The multiplying and accumulating machine 220 receives a stream of C vectors, each of which is of length N and represents one symbol in time and generates a D vector, of length M, from each C vector, as shown. The D vectors generated by the multiplying and accumulating machine are concatenated by a concatenator 230 and fed to interpolator 30 of FIG. 1 as a single stream of complex samples.

Functionally, the multiplying and accumulating machine 220 of FIG. 1 includes N filters as is apparent from the computation performed.

Figure 5:
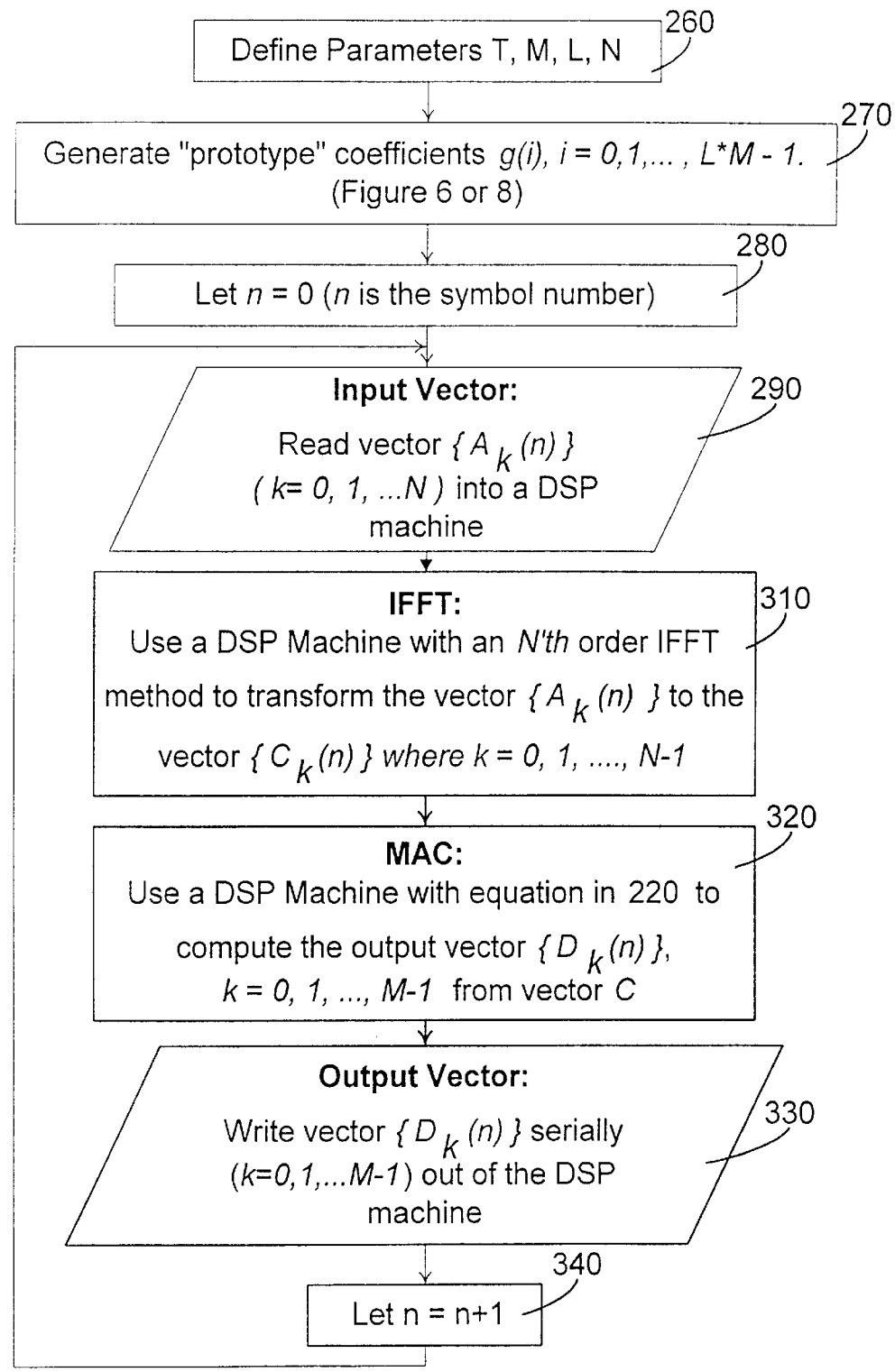
FIG. 5 is a simplified flowchart illustration of a preferred method of operation for the filter of FIG. 4.

FIG. 5 is a simplified flowchart illustration of a preferred method by which the filter array of FIG. 4 operates for an individual symbol n. Before operation of the method of FIG. 5, the parameters T, M, L and N are defined. Suitable examples of values are stated above in Table 1.

Suitable DSP machines for performing steps 290–330 may, for example, comprise an array of Motorola 56601 devices.

In step 310, suitable IFFT (inverse fast Fourier transform) methods are described in the above-referenced publication by Duhamel, 1986. FIG. 6 is a simplified flowchart illustration of an analytic method for generating the prototype coefficients g(m) used by the multiplying and accumulating machine 220 of FIG. 4 when performing step 320 of FIG. 5. The coefficients g(m) are determined as a function of L (symbol length), M (output samples per symbol interval) and N (order of IFFT), which are typically defined as a function of the application.

1/T is typically set to be the desired tone bandwidth.

$\alpha_0$ is the excess bandwidth, i.e. the ratio between the frequency separation between channels and the symbol rate. $\alpha_0$ and L together determine the out-of-band power which is preferably low for applications in which channels have ingresses.

N is typically determined by the desired number of tones.

▲f is typically equal to $(\alpha_0+1)/T$.

M, the number of samples per symbol, typically equals ▲f×T×N.

To simplify implementation, ▲f is preferably selected such that M is an integer.

Discrete Fourier transforms are described in the above-referenced Oppenheim publication, in Chapter 8.

Figure 7:
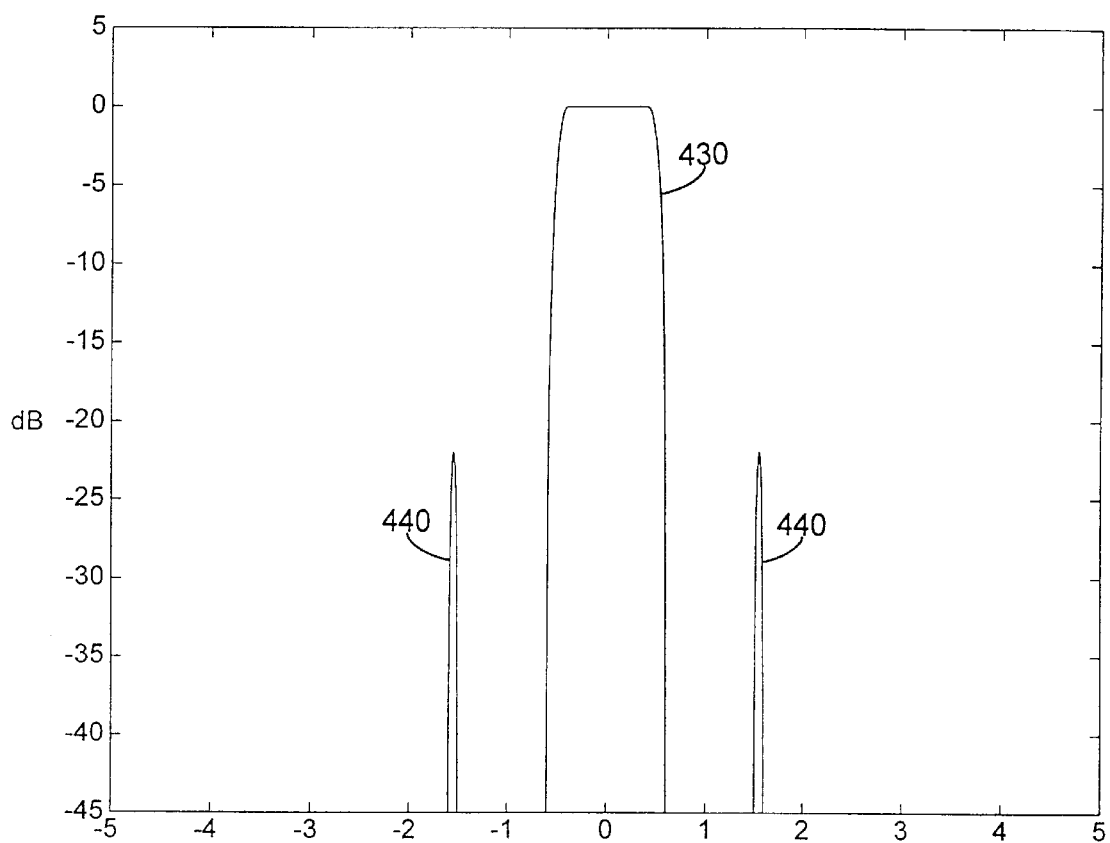
FIG. 7 is a graph of the frequency response of a signal whose samples are the coefficients generated by the method of FIG. 6.

FIG. 7 is a graph of the frequency response of a signal whose samples are the coefficients generated by the method of FIG. 6. The horizontal axis is in units of 1/T. The input parameters of the method of FIG. 6 were as follows:

M=70; N=64; ▲f=70/64−1.

It is appreciated that these values are not intended to be limiting.

As shown, the frequency response includes a main frequency component 430 and out-of-band auxiliary components 440, i.e. relatively small components whose frequency does not overlap with the frequency band of the main frequency component 430. The main frequency component 430 typically includes a Nyquist signal R(f) and much smaller in-band auxiliary components. In this example, $\alpha$, which is the excess bandwidth of R(f), is selected to equal $2\alpha_0$, where $\alpha_0$=▲f×T−1. Therefore, the main frequency component of each filter from among the array of N filters of FIG. 4, overlaps only the main frequency components of one or two adjacent filters.

Consequently, only two out-of-band auxiliary frequency components 440 are required to cancel inter-channel interference (ICI). For larger values of $\alpha$, more out-of-band auxiliary frequency components may be provided.

Step 420 may produce a coefficient vector whose length exceeds L×M in which case the vector may be truncated to length L×M which is suitable for unit 220 in the illustrated embodiment. Alternatively, a FIR filter design method, such as windowing, can be used to reduce the length of the coefficient vector. In the present specification, for simplicity, the output of step 420 and the shorter coefficient vector which may be generated therefrom are both termed g. The obtained filter length, L×M, can be approximately half the length of a conventional filter designed for FDM with non-overlapping filters.

Figure 8:
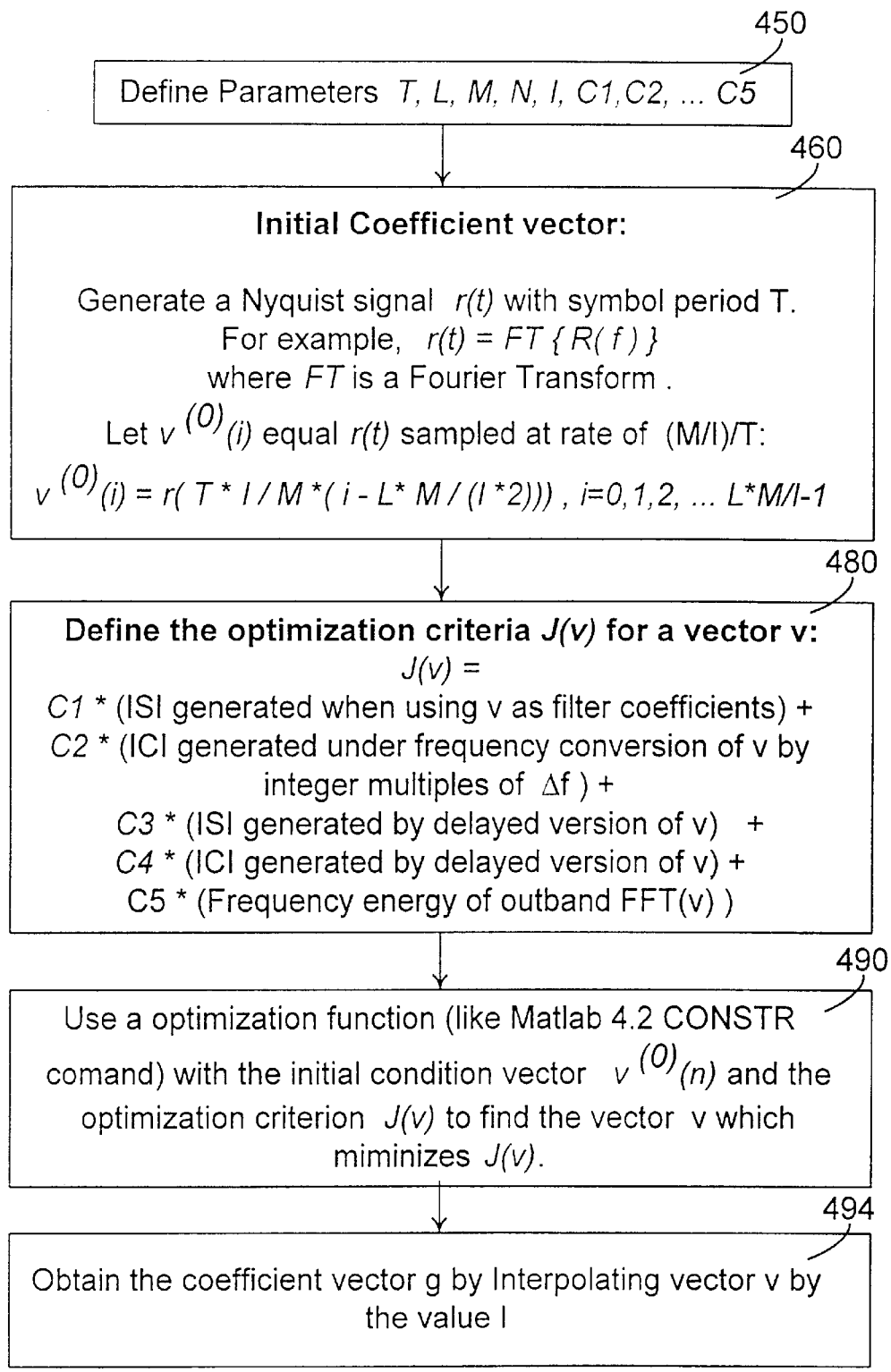
FIG. 8 is a simplified flowchart illustration of a numeric method for performing the coefficient generation step of FIG. 5.

FIG. 8 is a simplified flowchart illustration of an alternative, numeric method for generating the prototype coefficients g(k) used by the multiplying and accumulating machine 220 of FIG. 4 when performing step 320 of FIG. 5.

In step 490, a numeric optimization routine is performed to compute the coefficients of vector v so as to minimize a suitable optimization function. The vector $v^{(0)}$ serves as the initial condition of the optimization routine.

For example, the numeric optimization routine may be the Matlab 4.2 CONSTR command.

A suitable optimization function for vector g is a linear combination of the following quantities:

a. ISI (intersymbol interference) of the vector v, which may be computed by correlating v and v delayed by integer multiples of M samples;

b. Direct ICI (interchannel interference), which may be computed by correlating v and v translated in frequency by integer multiples of ▲f and delayed by integer multiples of M samples;

c. Timing offset ISI (intersymbol interference) of the vector v, which may be computed by correlating v delayed by a user-selected time-delay parameter which typically equals the expected timing offset of the transmission channel with v delayed by integer multiples of M samples;

d. Timing offset ICI (interchannel interference) of the vector v, which may be computed by correlating v delayed by a user-selected time-delay parameter which typically equals the expected timing offset of the transmission channel with v, translated in frequency by multiples of ▲f and delayed by integer multiples of M samples; and e. Rejection in frequency—The energy of the frequencies of the out-of-band FFT (fast Fourier transform) of the vector g.

These five impairments are weighted respectively by weights $C_1, \ldots, C_5$ which may for example be $C_1$=1, $C_2$=1, $C_3$=1, $C_4$=1, $C_5$=0.2. Conventional optimization typically includes only the ISI impairment (a) and the rejection in frequency, (e). In contrast, according to a preferred embodiment of the present invention, optimization also includes direct ICI (impairment (b)) which in effect facilitates occurrence of the auxiliary out-of-band components 510.

In certain applications it is acceptable for g to be symmetric. In these applications, the optimization routine may be performed to compute only one half of the coefficients of the vector v.

To reduce the number of variables in optimization, the vector g is preferably shortened. For example, a vector whose sampling rate is (M/I)/T, rather than M/T, may be used for optimization and the resulting vector may be up-sampled using a conventional interpolation method. The value of I is preferably in the range of ML/100 to ML/50.

Figure 9:
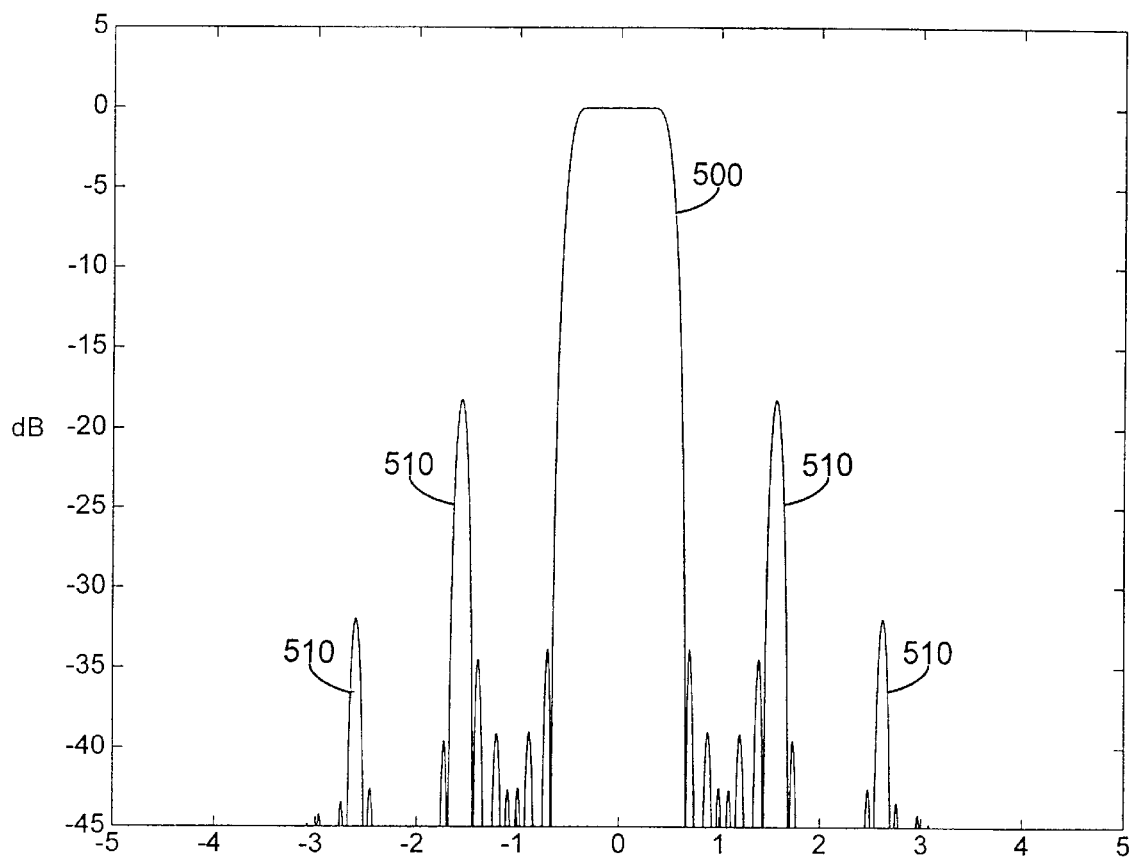
FIG. 9 is a graph of the frequency response of a signal whose samples are the coefficients generated by the method of FIG. 8.

FIG. 9 is a graph of the frequency response of a signal whose samples are the coefficients generated by the method of FIG. 8 with N=64, M=70, L=10, $C_1$=1, $C_2$=1, $C_3$=1, $C_4$=1, $C_5$=0.2. As shown, the frequency response includes a main frequency component 500 and out-of-band auxiliary frequency components 510 which cancel out overlap between the main frequency component and the frequencies of the main frequency components of at least two adjacent ones from among the N filters in the filter array of FIG. 4. As L and $\alpha_0$ decrease, more and more out-of-band auxiliary frequency components are generated and the effective bandwidth increases as a result.

Figure 10A:
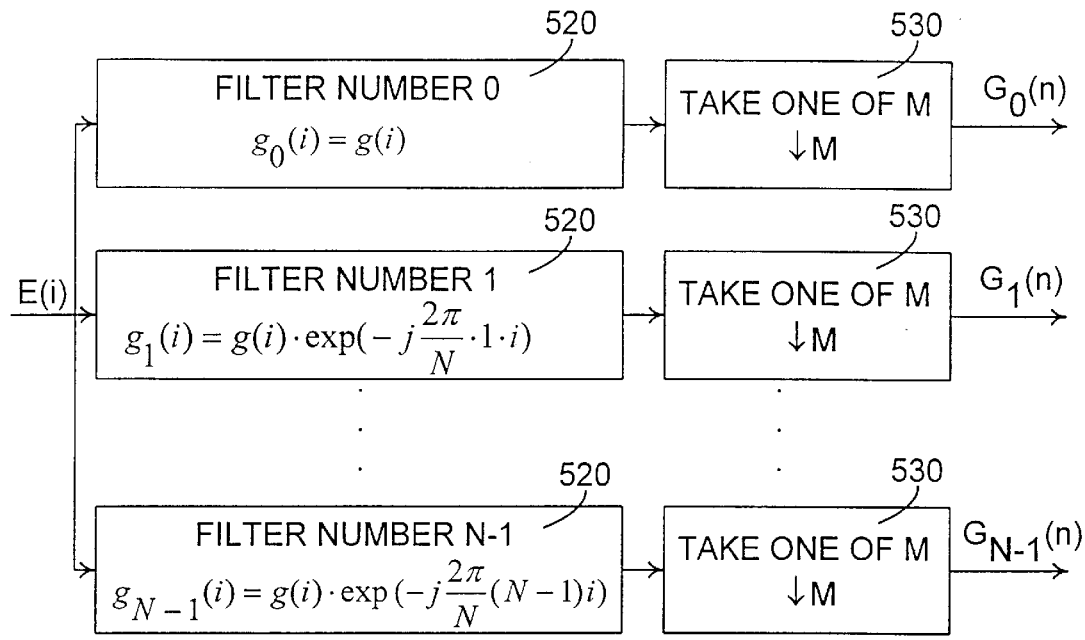
FIGS. 10a and 10b are is a simplified block diagrams of the filter of FIG. 2 constructed and operative in accordance with a preferred embodiment of the present invention.
Figure 10B:
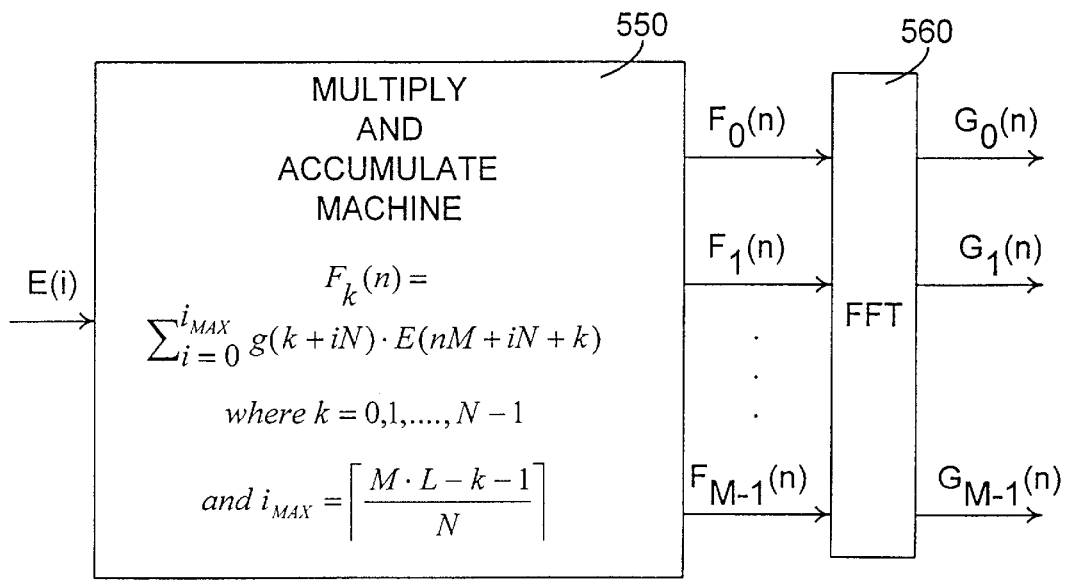

FIGS. 10A–10B are simplified block diagrams of the filter of FIG. 2 constructed and operative in accordance with two alternative embodiments of the present invention. As shown, the filter of FIGS. 10A or 10B preferably reconstructs the incoming vector $\{A_k(n)\}$ of FIGS. 4A–4B and the operations performed by the filter of FIGS. 10A–10B are preferably the inverses of the operations performed by the filter of FIGS. 4A or 4B. Each unit 530 is operative to select one of M samples supplied by a corresponding one of the filters 520.

It is appreciated that, alternatively, the multiplying and accumulating machine 550 of FIG. 10B may be based on a suitable computation other than the computation shown in FIG. 10B.

Figure 11:
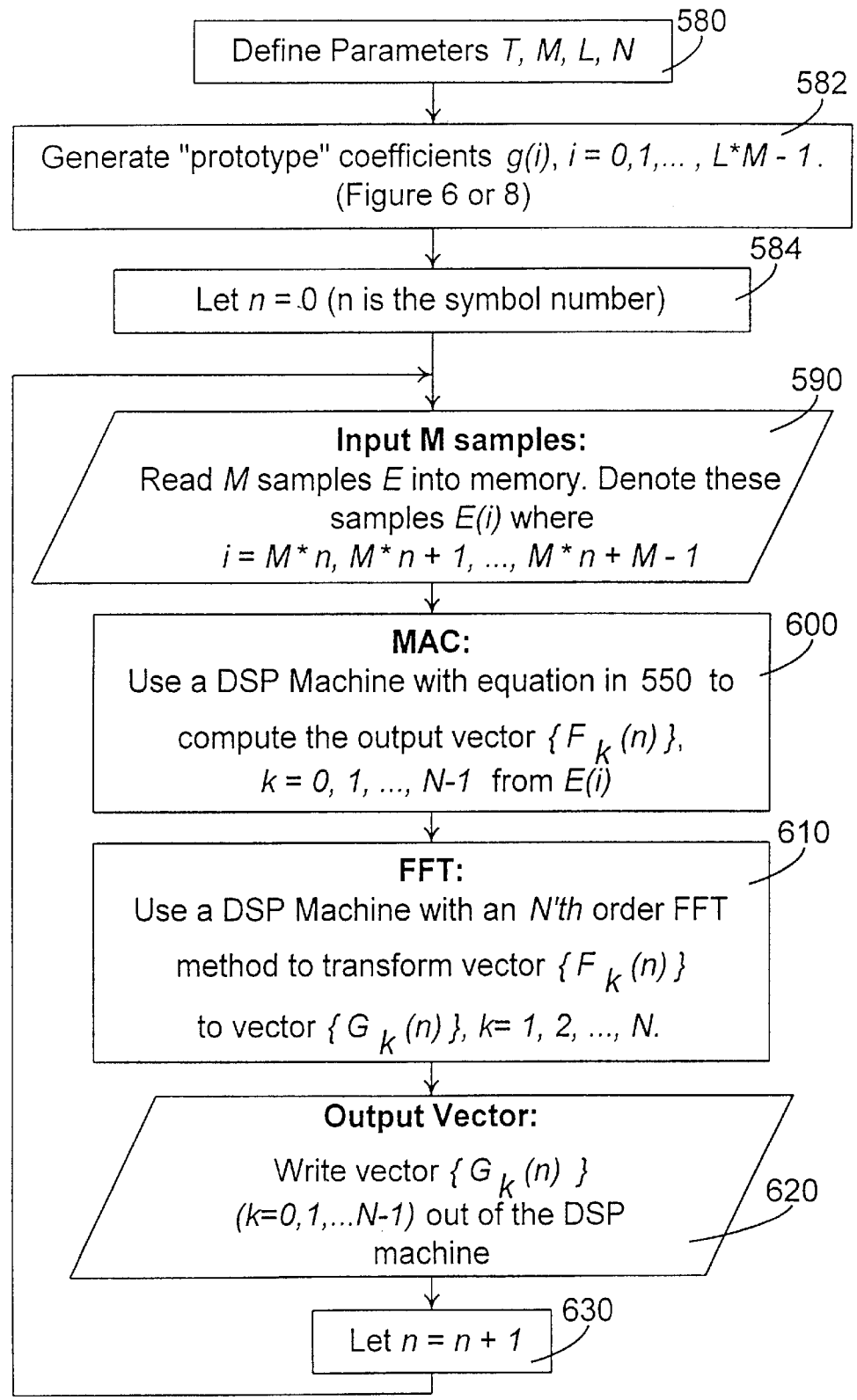
FIG. 11 is a simplified flowchart illustration of a preferred method for building the filter of FIG. 10.

FIG. 11 is a simplified flowchart illustration of a preferred method for initializing the filter of FIGS. 10A–10B (steps 580, 582, 584) and for normal operation of the filter of FIGS. 10A–10B (steps 590 onward).

It is appreciated that the coefficient generation step of FIGS. 5 and 11 may be performed using any suitable method and that the coefficient generation methods of FIGS. 6 and 8 are merely examples and are not intended to be limiting.

Figure 12:
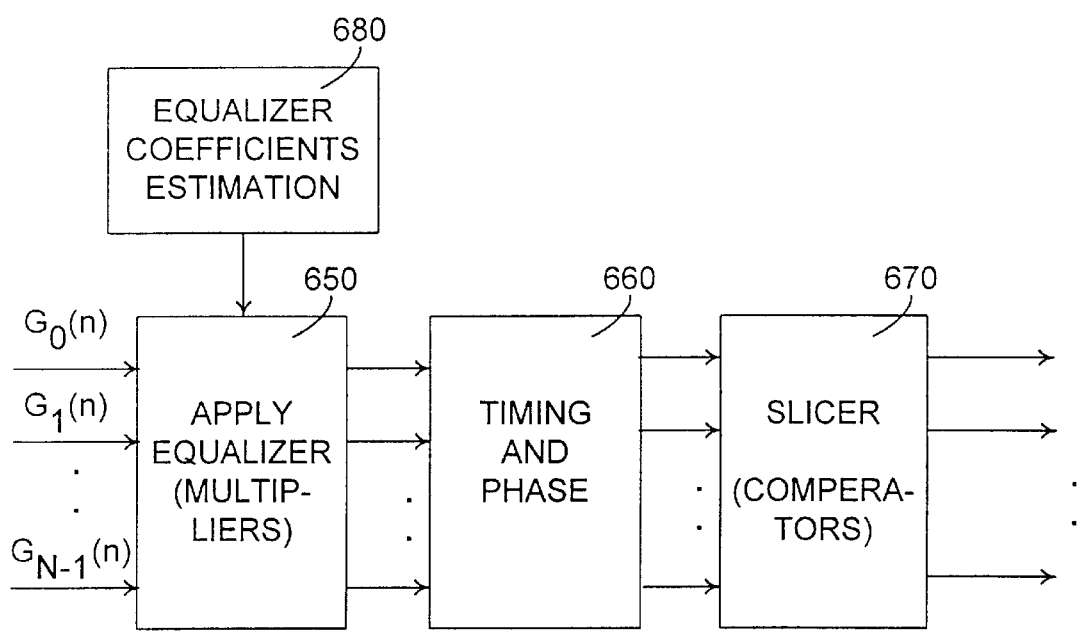
FIG. 12 is a simplified block diagram of the detector of FIG. 2 constructed and operative in accordance with a preferred embodiment of the present invention.

FIG. 12 is a simplified block diagram of the detector of FIG. 2 constructed and operative in accordance with a preferred embodiment of the present invention. The detector is operative to remove channel distortions which include the frequency response of the channel, timing uncertainty and carrier phase uncertainty. The equalizer coefficient estimation block 680 is operative to estimate the channel frequency response and to generate coefficients accordingly. Each coefficient has a phase and amplitude which operate to compensate for amplitude and phase errors imposed by the channel, at a particular frequency location.

Unit 650 includes an array of complex multipliers for multiplying input elements by corresponding coefficients generated by step 680.

Timing and phase unit 660 is operative, for each symbol, to carry out linear phase correction by rotation. Estimation of the slope and offset of the phase is carried out using some of the tones as pilots.

FIG. 13 is a simplified block diagram of the demapper of FIG. 2 constructed and operative in accordance with a preferred embodiment of the present invention. FIG. 13 reconstructs the bit stream by carrying out the inverse operations of blocks 150, 160 and 170 in FIG. 3.

Figure 14:
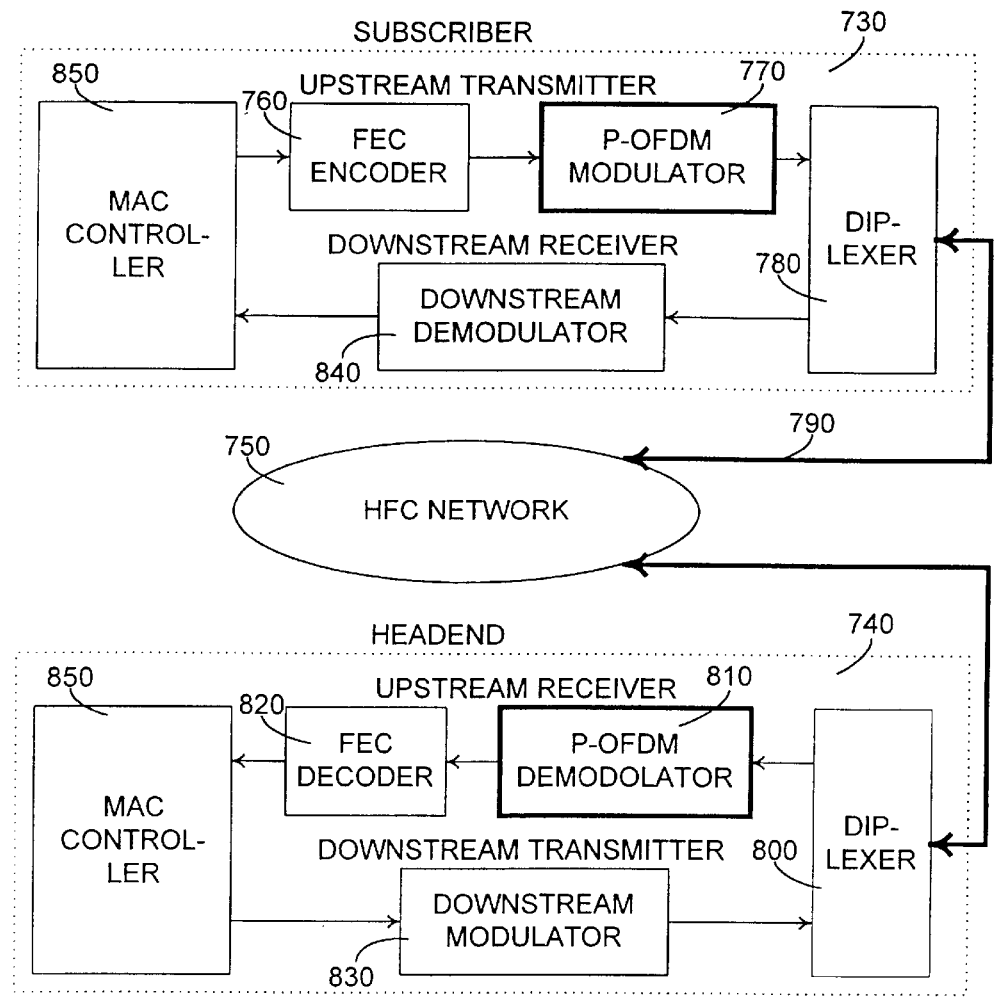
FIG. 14 is a simplified block diagram of a data cable modem system for HFC networks constructed and operative in accordance with a preferred embodiment of the present invention.

FIG. 14 is a simplified block diagram of a data cable modem system for HFC networks constructed and operative in accordance with a preferred embodiment of the present invention. The apparatus of FIG. 14 includes subscriber units 730 of which one is shown and a headend unit 740, all of which share the HFC network 750. The system of FIG. 14 comprises both an upstream link for upstream communications (from subscriber units 730 to headend 740) and a parallel downstream link for downstream communications (from headend 740 to subscriber units 730).

The subscriber unit 730 includes three elements which belong to the upstream link: a FEC (forward error correction) encoder 760, a modulator 770 and a diplexer 780. The FEC 760 may for example comprises a Reed Solomon encoder, such as an LSI Logic L64768. The modulator 770 may comprise the modulator of FIG. 1. The diplexer 780 multiplexes the upstream and downstream signals to a coax cable 790. The diplexer 780 may for example comprise Mini-Circuits's JCPLX42-860-1.

The upstream link comprises the following elements in the headend unit 740: A diplexer 800, a demodulator 810, and a FEC decoder 820. The demodulator 810 preferably includes the demodulator of FIG. 2. The FEC decoder 820 may for example comprise a Reed Solomon decoder such as an LSI Logic L64713.

The downstream link comprises a downstream modulator 830 in the headend 740 and a downstream demodulator 840 in the subscriber unit 730. The downstream modulator 830 may for example comprise a Comstream CM720 and the downstream demodulator 840 may for example comprise a Comatlas CAS2514.

Both the subscriber unit 730 and the headend unit 740 include a MAC (media access) controller 850 which may be constructed in accordance with the IEEE 802.14 specification and/or the MCNS specification. The IEEE 802.14 specification is obtainable at the following Internet address: http://www.walkingdog.com after joining the IEEE802.14 Working Group. The MCNS specification is obtainable at the following Internet address: http://www.cablemodem.com.

The system of FIG. 14 is capable of operating in upstream mode within a TDMA (time division multiple access) configuration which allows single symbols to be delivered within a specific time-slot.

FIGS. 15A–15C are simplified graphic illustrations of the frequency spectrums of two adjacent filters from among an array of filters performing the following three prior art multi-carrier modulation methods respectively: FDM (frequency division multiplexing), SQAM (staggered quadrature amplitude modulation) and DMT (discrete multi-tone).

FIG. 15D is a simplified graphic illustration of the frequency spectrum of two adjacent filters from among an array of filters performing a multi-carrier modulation method operative in accordance with a preferred embodiment of the present invention.

Appendix A, appended hereto, includes software procedures useful in implementing some of the methods and apparatus of the present invention. To run any of the software procedures of Appendix A, a text editor may be used with a PC to generate files whose contents are listed in Appendix A. The name of each file is indicated at the top of each page relating to that file in Appendix A. A MatLab 4.2 system including the tools listed on page 2 of Appendix A is installed in the PC. MatLab systems are commercially available from MathWorks, Inc. Any of the programs may now be run, in accordance with the instructions in the Matlab user manual.

The software procedures of Appendix A include:

1. p_ofdm.m—A software implementation of a preferred analytic method for generating coefficients of a filter of the type shown and described herein;

2. shap_opt.m—A software implementation of a preferred numeric method for generating coefficients of a filter of the type shown and described herein;

3. fil_demo.m—A software filtering method which performs the functions of the filters of FIGS. 4A–B and 10A–B;

4. demo1.m—A script file that demonstrates the use of procedures p_ofdm.m and fil_demo.m.

5. demo2.m—A script file that demonstrates the use of procedures shap_opt.m and fil_demo.m.

The software components may, generally, be implemented in hardware, if desired, using conventional techniques.

It is appreciated that the particular embodiment described in the Appendices is intended only to provide an extremely detailed disclosure of the present invention and is not intended to be limiting.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

I claim:

1. A signal modulation method comprising:

receiving at least first and second synchronized incoming streams of complex symbols, thereby to define a plurality of incoming vectors each including at least first and second synchronized complex symbols;

mapping each complex symbol into a signal component comprising a linear combination of an in-phase signal and a quadrature signal, the quadrature signal comprising a Hilbert transform of said in-phase signal, wherein all of the signal components are substantially mutually orthogonal, and wherein the frequency spectrums of all signal components mapped from a single incoming stream are centered around a common frequency location which is unique to said single incoming stream and wherein the frequency spectrums of signal components mapped from different incoming streams having adjacent common frequency locations are partially overlapping;

and wherein signal components mapped from sequential incoming symbols partially overlap in time; and combining all of the signal components into a representation of an output signal.

2. A method according to claim 1 wherein each signal component is proportional to a temporal translation and/or a frequency translation of each other signal component.

3. A method according to claim 1 wherein the incoming vectors arrive at a given symbol rate and wherein each said signal component comprises a main frequency component defining a central main frequency value and wherein, for each pair of signal components generated from different incoming streams, the distance between their central main frequency values exceeds said symbol rate.

4. A method according to claim 1 wherein each signal component comprises a main frequency component centered at said common frequency location and auxiliary frequency components arranged around the common frequency location.

5. A method according to claim 4 wherein the main frequency component of each signal component mapped from a particular incoming stream overlaps the main frequency component of each signal component mapped from an incoming stream having an adjacent common frequency location.

6. A method according to claim 5 and wherein, for each pair of signal components mapped from incoming streams having adjacent common frequency locations, the auxiliary frequency components of said pair of signal components cancel out interference resulting from the partial overlap of their main frequency components.

7. A method according to claim 5 and wherein, for each pair of signal components mapped from different incoming streams whose main frequency components partially overlap, the auxiliary frequency components of said pair of signal components cancel out any interference resulting from the partial overlap of their main frequency components.

8. A method according to claim 7 wherein said different incoming streams have non-adjacent common frequency locations.

9. A signal demodulation method comprising:

receiving an input signal comprising a superposition of mutually orthogonal signal components; and generating at least first and second synchronized outgoing streams of complex symbols from the input signal, thereby to define a plurality of outgoing vectors each including at least first and second synchronized outgoing complex symbols;

wherein each signal component generates a corresponding outgoing complex symbol and comprises a linear combination of an in-phase signal and a quadrature signal, the quadrature signal comprising a Hilbert transform of said in-phase signal;

and wherein the frequency spectrums of all signal components generating complex symbols in a single outgoing stream are centered around a common frequency location which is unique to said single outgoing stream and wherein the frequency spectrums of signal components generating complex symbols in different outgoing streams having adjacent common frequency locations are partially overlapping;

and wherein signal components generating sequential outgoing vectors partially overlap in time.

10. A signal demodulation method according to claim 9 wherein each signal component is mapped from a corresponding original complex symbol.

11. A signal modulation system comprising:

a complex symbol filter array operative to receive at least first and second synchronized incoming streams of complex symbols, thereby to define a plurality of incoming vectors each including at least first and second synchronized complex symbols, and to filter each complex symbol into a baseband representation of a signal component comprising a linear combination of an in-phase signal and a quadrature signal, the quadrature signal comprising a Hilbert transform of said in-phase signal, wherein all of the signal components are substantially mutually orthogonal, and wherein the frequency spectrums of all signal components filtered from a single incoming stream are centered around a common frequency location which is unique to said single incoming stream and wherein the frequency spectrums of signal components filtered from different incoming streams having adjacent common frequency locations are partially overlapping, and wherein signal components filtered from sequential incoming symbols partially overlap in time; and a signal component combining unit operative to combine all of the baseband representations of the signal components into a representation of an output signal.

12. A method according to claim 1 wherein said combining step comprises superimposing all of the baseband representation of the signal components, thereby to generate the output signal.

13. A method according to claim 1 wherein said combining step comprises superimposing linear transformation of each of the baseband representations of the signal components, thereby to generate the output signal.

14. A method according to claim 1 wherein all signal components mapped from a single incoming vector are centered around a common temporal location which is unique to said single incoming vector.

15. A method according to claim 9 and wherein all signal components generating a single outgoing vector are centered around a common temporal location which is unique to said single outgoing vector.

16. A method according to claim 1 wherein said representation of an output signal comprises the output signal itself.

17. A method according to claim 1 wherein said representation of an output signal comprises samples of the output signal.

18. A system according to claim 11 and also comprising a complex symbol generating mapper operative to receive an input bit stream and to generate therefrom at least first and second synchronized incoming streams of complex symbols.

19. A system according to claim 11 and also comprising a digital baseband-to-analog RF conversion unit operative to translate said representation of an output signal into an analog RF signal.

20. A system according to claim 19 wherein said digital baseband-to-analog RF conversion unit comprises:

an interpolator generating an up-sampled output;

a digital RF up-converter receiving said up-sampled output and generating therefrom a digital representation of an RF signal by up-converting said up-sampled output into RF;

a D/A converter operative to convert said digital representation of the RF signal into an analog RF signal; and an analog front-end operative to receive the analog signal from the D/A converter and to filter and to amplify said analog signal.

21. A system according to claim 19 wherein said digital baseband-to-analog RF conversion unit comprises:

an interpolator generating an up-sampled output;

a digital IF up-converter receiving said up-sampled output and generating therefrom a digital representation of an IF signal by up-converting said up-sampled output into IF;

a D/A converter operative to convert said digital representation of the IF signal into an analog IF signal; and an analog front-end operative to receive the analog IF signal from the D/A converter, to filter said analog IF signal, thereby to generate a filtered signal, to up-convert said filtered signal into RF, thereby to generate a filtered RF signal, and to amplify said filtered RF signal.

22. A signal demodulation system comprising:

a narrow bandpass overlapping frequency filter array operative to receive an input signal transmitted through a communication channel, said input signal comprising a baseband representation of a channel-distorted superposition of mutually orthogonal signal components and to generate at least first and second synchronized outgoing streams of complex values from the input signal, thereby to define a plurality of outgoing vectors each including at least first and second synchronized outgoing complex values, wherein each signal component generates a corresponding outgoing complex value and comprises a linear combination of an in-phase signal and a quadrature signal, the quadrature signal comprising a Hilbert transform of said in-phase signal, and wherein the frequency spectrums of all signal components generating complex values in a single outgoing stream are centered around a common frequency location which is unique to said single outgoing stream and wherein the frequency spectrums of signal components generating complex values in different outgoing streams having adjacent common frequency locations are partially overlapping, and wherein signal components generating sequential outgoing vectors partially overlap in time; and a complex symbol detector operative to receive from the filter the at least first and second synchronized outgoing streams of complex values and to generate therefrom at least first and second streams of complex symbols.

23. A system according to claim 22 wherein said complex symbol detector comprises:

an equalizer operative to receive said at least first and second synchronized outgoing streams of complex values and to multiply them by at least first and second complex coefficients respectively, thereby to generate at least first and second streams of equalized complex values respectively;

timing and phase circuitry operative to receive said at least first and second equalized complex values and to back-rotate them by at least first and second estimated angles respectively which compensate for phase and timing offsets introduced by the communication channel, thereby to generate at least first and second streams of equalized back-rotated values respectively; and a slicer operative to receive said at least first and second streams of equalized back-rotated values and to map them to first and second streams of complex symbols respectively.

24. A system according to claim 22 and also comprising a demapper operative to receive from the complex symbol detector at least first and second streams of complex symbols, and to demap said first and second streams of complex symbols, thereby to generate an output bit stream.

25. Subscriber apparatus for a cable modem system, the subscriber apparatus comprising:

an upstream forward error correction (FEC) encoder receiving an upstream bit stream and generating an encoded bit stream;

an upstream modulator receiving the encoded bitstream from the upstream FEC encoder and generating an RF output;

a diplexer receiving the RF output and feeding the RF output onto a cable and receiving an external downstream signal from the cable;

a downstream demodulator receiving the downstream external signal from the diplexer and generating a downstream bit stream; and a MAC controller operative to generate said upstream bit stream and supply said upstream bit stream to said FEC encoder and to receive said downstream bit stream, wherein said upstream modulator comprises:
a signal modulation system according to claim 19; and
a complex symbol generating mapper operative to receive an input bit stream and to generate therefrom at least first and second synchronized incoming streams of complex symbols.

26. A system according to claim 22 and also comprising:

an analog RF to digital baseband converter operative to receive an input analog RF signal, to convert said input analog RF signal to an up-sampled digital representation of a baseband signal corresponding to said input analog RF signal; and a decimator operative to receive and down-sample said up-sampled digital representation of the baseband signal and to supply the down-sampled digital representation of said baseband signal to said narrow bandpass overlapping frequency filter array as an input signal.

27. Headend apparatus for a cable modem system, the headend apparatus comprising:

an upstream demodulator comprising:
a signal demodulation system according to claim 24 and also comprising an analog RF to digital baseband converter operative to receive an input analog RF signal and to convert said input analog RF signal to an up-sampled digital representation of a baseband signal corresponding to said input analog RF signal; and
a decimator operative to receive and down-sample said upsampled digital representation of the baseband signal and to supply the downsampled digital representation of said baseband signal to said narrow bandpass overlapping frequency filter array as an input signal;

a FEC decoder receiving an output from said upstream demodulator;

a MAC controller receiving an output of the FEC decoder; and a downstream modulator receiving an output from the MAC controller.

28. A system according to claim 18 and also comprising a digital baseband-to-analog RF conversion unit operative to translate said representation of an output signal into an analog RF signal.

29. A system according to claim 23 and also comprising a demapper operative to receive from the complex symbol detector at least first and second streams of complex symbols, and to demap said first and second streams of complex symbols, thereby to generate an output bit stream.

30. A system according to claim 29 and also comprising:

an analog RF to digital baseband converter operative to receive an input analog RF signal, to convert said input analog RF signal to an up-sampled digital representation of a baseband signal corresponding to said input analog RF signal; and a decimator operative to receive and down-sample said up-sampled digital representation of the baseband signal and to supply the down-sampled digital representation of said baseband signal to said narrow bandpass overlapping frequency filter array as an input signal.

* * * * *